United States Patent [19]

Pernsteiner et al.

[11] 4,042,139
[45] Aug. 16, 1977

[54] VEHICLE WHEEL-REMOVING AND HANDLING DEVICE

[76] Inventors: Harold R. Pernsteiner, Rte. No. 2; Ernest H. Streckert, Rte. No. 3, both of Medford, Wis. 54451

[21] Appl. No.: 575,959

[22] Filed: May 9, 1975

[51] Int. Cl.² .......................................... B60B 29/00
[52] U.S. Cl. .................................. 214/331; 29/273; 254/2 R
[58] Field of Search ........................... 214/330–334, 214/653, 147 G; 29/252, 273; 294/104; 254/2 R, 133; 105/215

[56] References Cited

U.S. PATENT DOCUMENTS

| | | | |
|---|---|---|---|
| 2,243,006 | 5/1941 | Houston | 29/252 |
| 2,541,494 | 2/1951 | Bryan | 214/331 |
| 2,667,283 | 1/1954 | McDonnald et al. | 214/653 |
| 2,903,049 | 9/1959 | Carlson | 214/331 |
| 3,322,455 | 5/1967 | Gressbach | 294/104 |
| 3,830,387 | 8/1974 | Virnig | 214/333 |
| 3,908,258 | 9/1975 | Barty | 29/252 |

Primary Examiner—Lawrence J. Oresky
Attorney, Agent, or Firm—Berman, Aisenberg & Platt

[57] ABSTRACT

A wheel-removing and handling dolly device for dual or single-tired vehicle wheel assemblies consisting of a wheeled base having an upstanding post containing a hydraulic lifting ram cylinder whose piston rod is connected to a carriage assembly slidably engaged on the post. Respective gripping lever arms are provided on opposite sides of the carriage assembly, the lever arms having tire-gripping members horizontally pivoted to their outer end portions adapted to grippingly engaged diametrically opposite portions of a wheel assembly. The inner end of one of the lever arms is operatively connected to a hydraulic clamping cylinder assembly. A hydraulic wheel puller cylinder is carried horizontally by the carriage, extending between the gripping lever arms and having an extensible piston rod provided with a wheel hub-engaging head portion. A manually operated ram pump is carried on the carriage assembly and is connected through respective control valves to the lifting cylinder, the clamping cylinder and the wheel puller cylinder. After a wheel assembly is clamped and pulled from a vehicle, the wheel assembly can be rotated to a horizontal position, providing access to its brake drum or other parts for repair, cleaning or other servicing operations.

9 Claims, 6 Drawing Figures

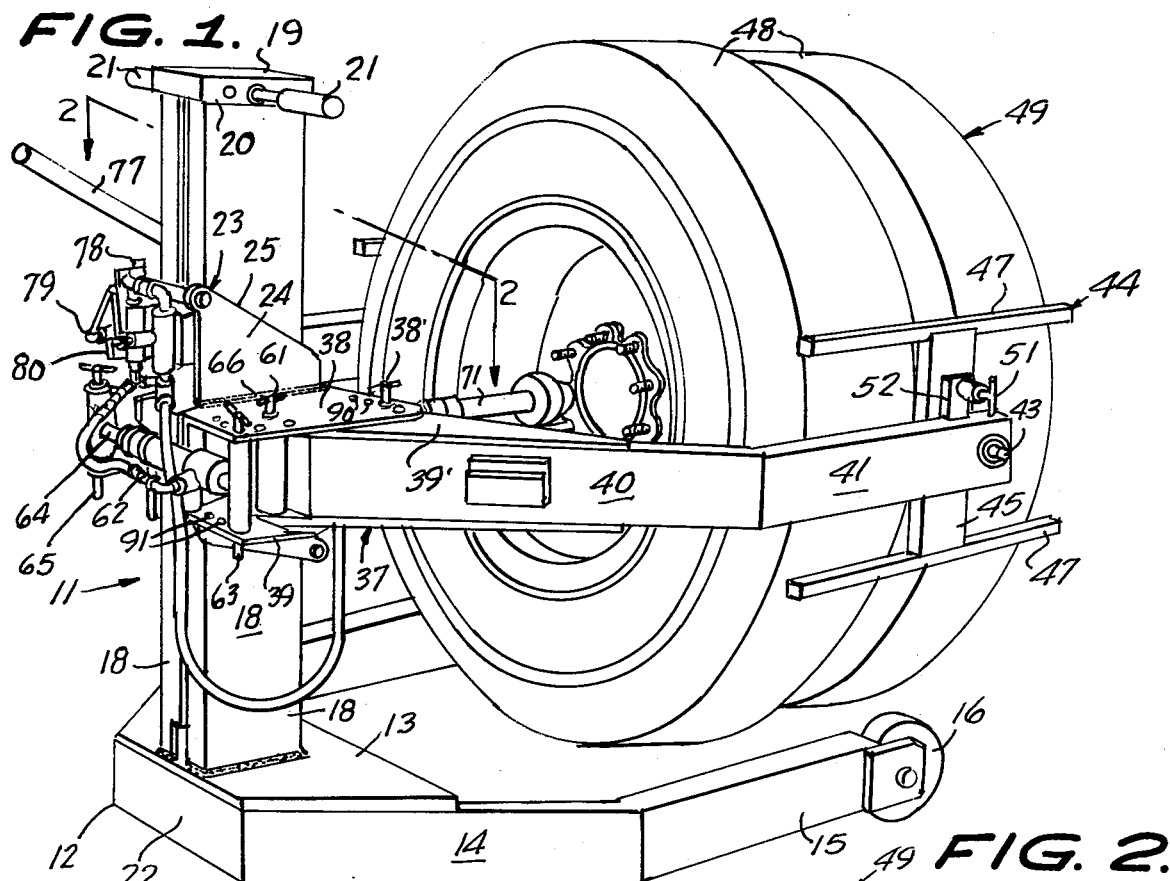
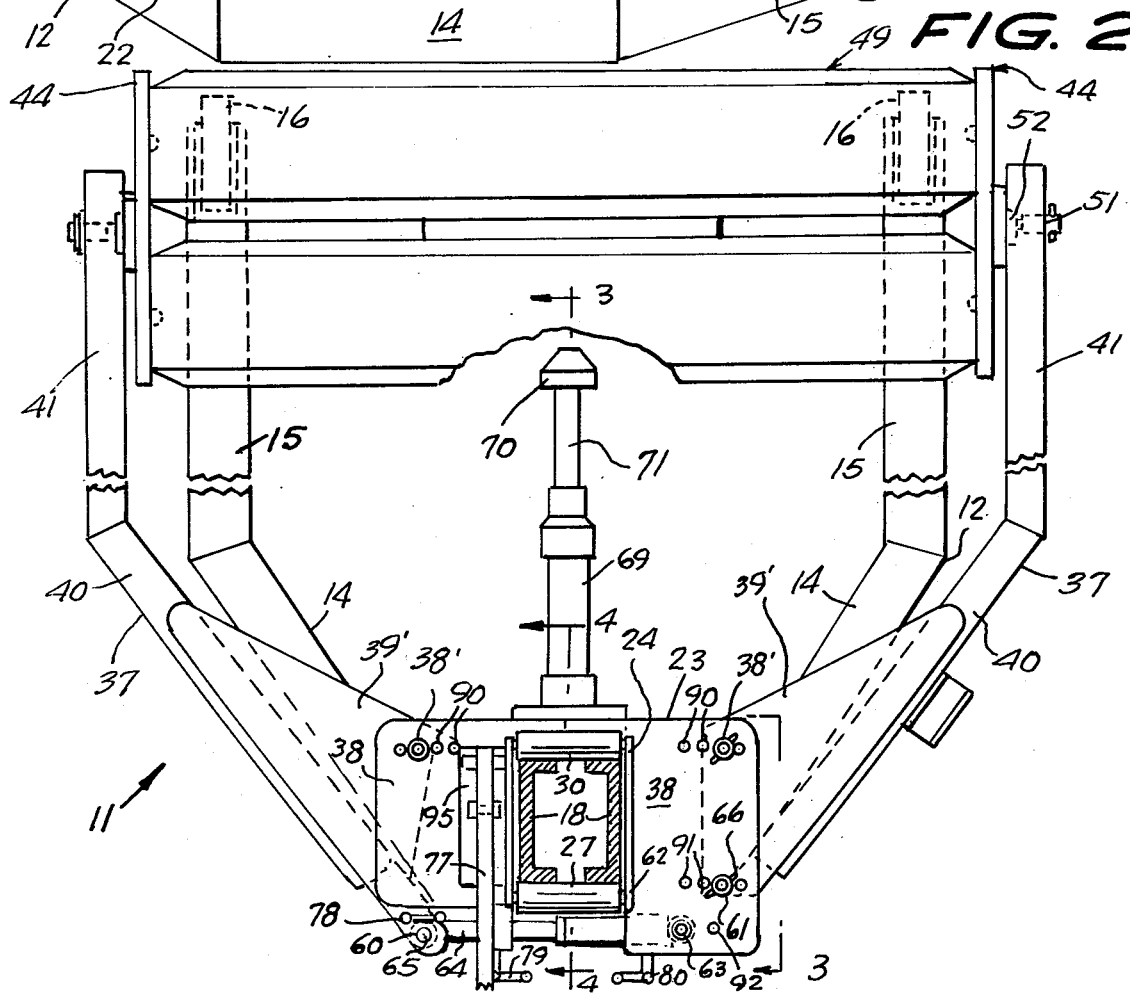

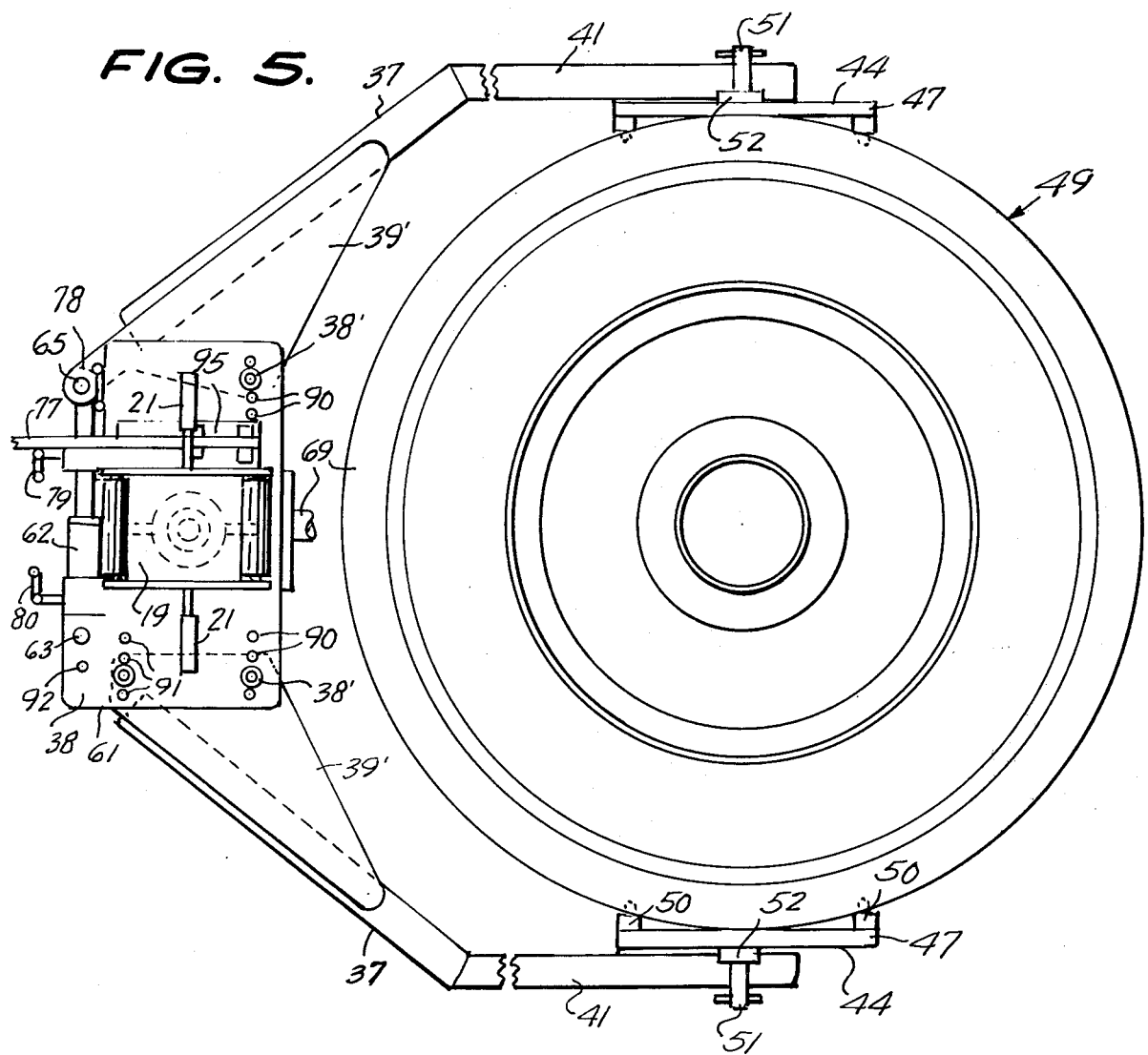
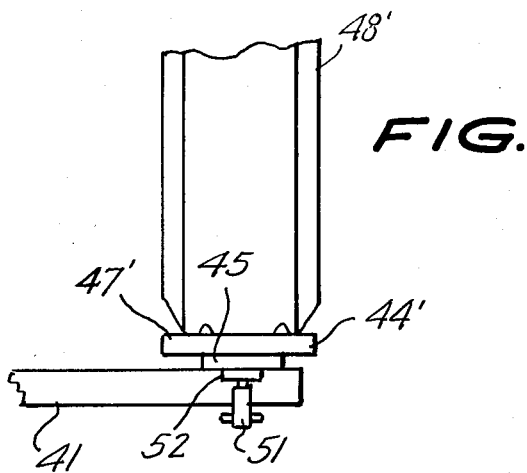

VEHICLE WHEEL-REMOVING AND HANDLING DEVICE

This invention relates to vehicle wheel-removing and handling dolly devices, and more particularly to a dolly device adapted for use in removing heavy truck wheels from a vehicle and for subsequently allowing the removed wheels to be properly oriented for repair, cleaning or other servicing operations on parts carried by the removed wheel assembly.

A main object of the invention is to provide a novel and improved apparatus for removing and handling heavy truck tires or other cumbersome or massive wheel assemblies, the device being relative simple in construction, enabling the wheel assemblies to be removed and subsequently handled with a minimum of physical labor, and providing a means for servicing wheels and parts carried by the wheel assembly, such as wheel bearings, brake drums, grease seals, and other parts which may require repair, cleaning or other servicing operations.

A further object of the invention is to provide an improved combination wheel dolly and wheel handling apparatus which is easy to operate, which is rugged in construction, and which enables a heavy and massive double truck wheel assembly, or similar wheel assembly to be removed from its associated vehicle and subsequently properly oriented for performing required servicing operations on the wheel assembly or parts carried thereby, the apparatus being operable by a single individual and enabling said individual to easily remove a wheel assembly from its associated vehicle and subsequently handle said assembly with a minimum amount of physical effort.

A still further object of the invention is to provide a combination wheel puller and dolly device which can be employed to remove a dual-tired wheel assembly from a truck or similar vehicle and which is arranged so that the wheel assembly can then be moved to a convenient location and rotated to a substantially horizontal position, providing access to its brake drum, bearings, or other parts for repair, cleaning or other required servicing operations.

Further objects and advantages of the invention will become apparent from the following description and claims, and from the accompanying drawings, wherein:

FIG. 1 is a perspective view of an improved wheel-removing and handling dolly apparatus constructed in accordance with the present invention, shown gripping a dual-tired vehicle wheel assembly, the wheel assembly being in a vertical position such as immediately after being removed from its associated vehicle axle.

FIG. 2 is a horizontal cross-sectional view taken substantially on the line 2—2 of FIG. 1.

FIG. 5 is a top plan view of the apparatus shown in FIGS. 1 to 4, showing the clamped dual wheel assembly rotated to a substantially horizontal position.

FIG. 6 is a fragmentary top plan view showing a modification wherein the apparatus is employed for clampingly engaging a single wheel assembly.

Figure 3:
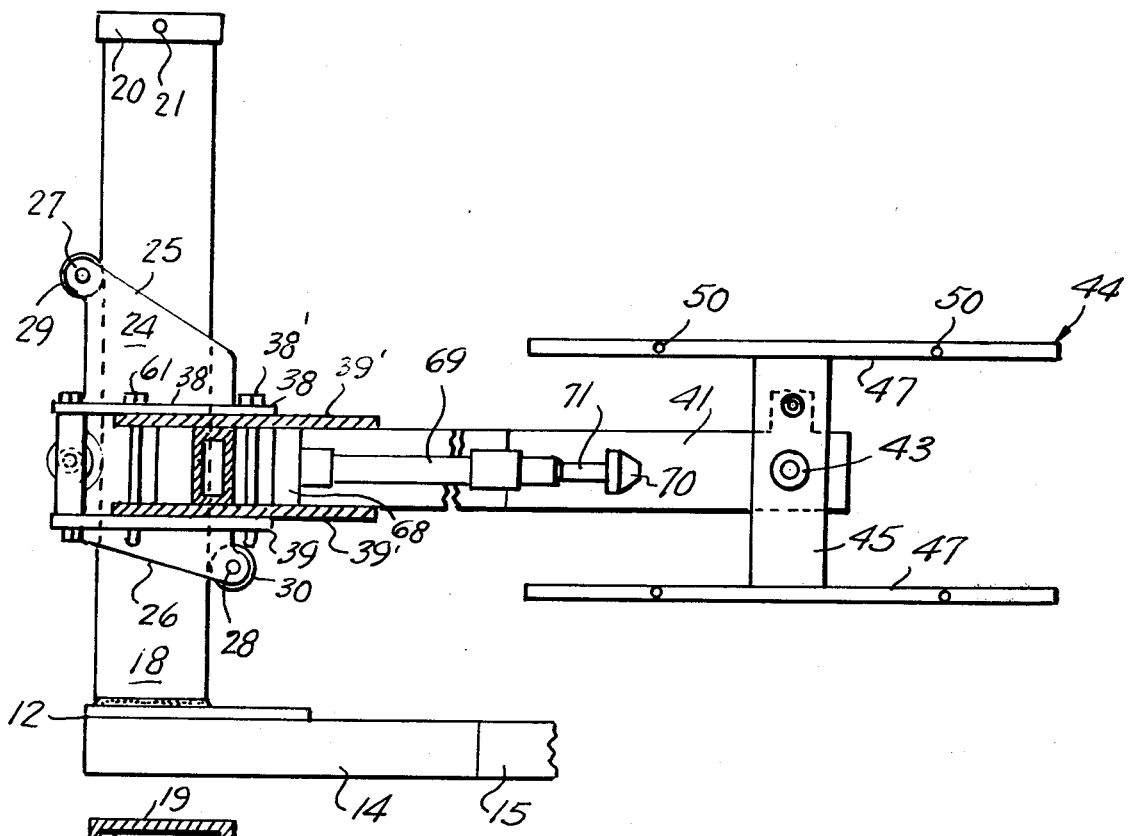
FIG. 3 is a longitudinal vertical cross-sectional view taken substantially on the line 3—3 of FIG. 2.

Referring to the drawings, 11 generally designates a typical wheel-removing and handling dolly apparatus constructed in accordance with the present invention, arranged for use with the dual-tired wheel assemblies such as are employed on large trucks, buses, or the like. Such dual assemblies are relatively massive and ordinarily a large amount of physical labor is required for the removal and handling of such assemblies. The apparatus 11 is intended to facilitate such removal and handling.

The apparatus 11 comprises a wheeled base of general U-shape, shown at 12, having a horizontal supporting platform 13 mounted on rightwardly divergent arms 14,14 which are provided with the parallel end portions 15,15. Journaled to the ends of the portions 15 are respective supporting wheels 16. The platform 13 is provided with a swivelly mounted caster wheel 17, so that the base 12 is supported by wheels 16, 16 and swiveled caster wheel 17 in a manner allowing it to be easily moved and turned.

Welded on the intermediate portion of the platform member 13 are a pair of inwardly opposing vertical channel bars 18,18 rigidly connected at their top ends by a cover plate 19 and provided with a top collar element 20 to the opposite sides of which are secured the oppositely projecting handle elements 21,21 which may be employed for pushing or pulling the device and for otherwise guiding the direction of its movement.

Figure 4:
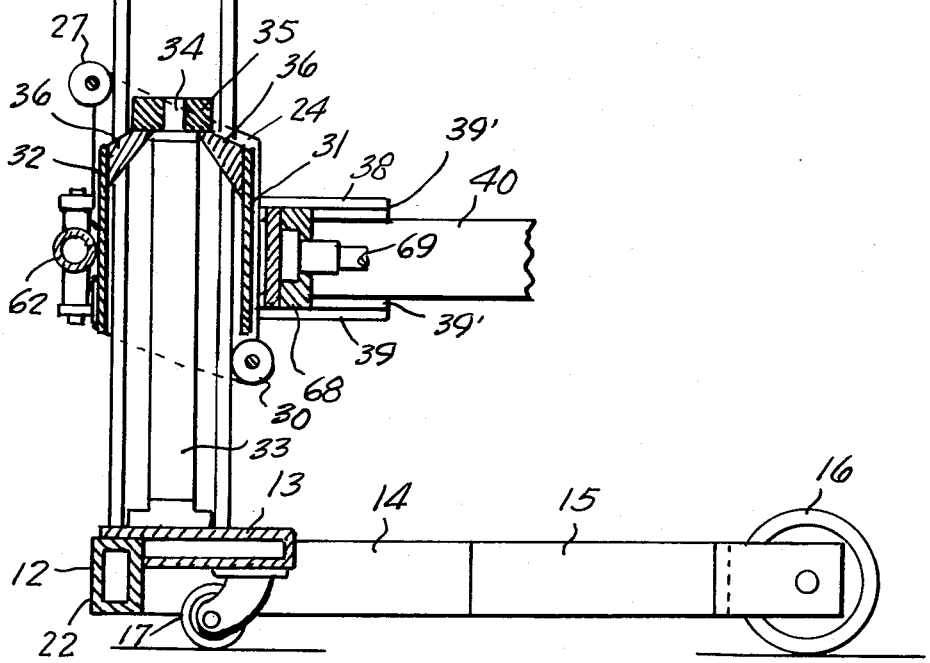
FIG. 4 is a longitudinal vertical cross-sectional view taken substantially on the line 4—4 of FIG. 2.

The U-shaped base 12 also includes the transversely extending end wall portion 22 which is rigidly connected to the rightwardly divergent arm portions 14, and the platform element 13 is rigidly secured, as by welding, or the like to the top walls of the members 22 and 14, which may be of rectangular tubular construction, as shown in FIG. 4, the parallel portions 15,15 being likewise of such rectangular tubular construction.

Designated generally at 23 is a carriage assembly which is slidably engaged on the upstanding post member defined by the channels 18,18. The carriage assembly 23 comprises a pair of vertical side plates 24,24 which are of generally parallelogram shape having upwardly and rearwardly inclined top edges 25 and downwardly and forwardly inclined bottom edges 26. The plate members 24 project beyond the post channels 18 and are formed with respective top lugs 27 and bottom lugs 28. Respective rollers 29 and 30 are journaled between the pair of top lugs 27,27 and the pair of bottom lugs 28,28, the rollers engaging the transverse vertical surfaces of the post channel elements 18 with rolling contact. The front and rear margins of the plates 24 are connected by transverse vertical plate members 31 and 32, as shown in FIG. 4 so that the carriage body is substantially in the form of a vertical sleeve slidable on the post structure. Mounted inside the post structure on the base plate portion 13 thereof is an upstanding hydraulic cylinder 33 having the vertically extensible cylinder piston rod 34 to which is secured a collar member 35 connected by bar members 36,36 to the respective transverse plates 31,32, as shown in FIG. 4. Thus, the carriage assembly 23 may be vertically adjusted by suitably operating the hydraulic cylinder 33, as will be presently described.

Designated at 37,37 are respective horizontally extending lever members connected by vertical pins to opposite sides of the carriage assembly. Thus, vertically spaced top and bottom horizontal plate members 38,39 are rigidly secured to the opposite side plate member 24, and the lever members are connected therebetween by means of vertical pivot pin members 38', 38'.

As shown in FIG. 2, the levers are provided with top and bottom generally triangular inwardly extending top and bottom plate members 39', the pivotal connections including the pin members 38' being located substantially at the inner corners of the plate members 39'. The outer margins of the plate members 39' are rigidly secured to the top and bottom surfaces of forwardly divergent gripping arm portions 40 forming part of the levers 37. The forward portions of the levers 37 comprise end arms 41,41 which are angled relative to the portions 40 so as to be substantially parallel to each other in the operating position of the device, shown in FIG. 2.

Pivotally connected by horizontal pivot pins 43 to the forward ends of the arms 41 are respective wheel-clamping assemblies, designated generally at 44,44. The wheel-clamping assemblies 44 comprise respective bar elements 45 pivotally connected at their intermediate portions by the pins 43 to the arm portions 41, and rigidly connected to the opposite ends of the bars 45 are parallel cleat members 47,47. Cleat members 47, 47 are connected at their midportions to the bar portions 45, and are of substantial length, being of sufficient length to transversely engage over the treads of the tires 48,48 of a typical dual wheel assembly 49 in the manner shown in FIG. 1. The cleats 47 may be provided with inwardly projecting clamping pins or lugs 50 adapted to be embedded in the tire treads under the clamping pressure exerted thereon, as will be presently described, to provide a firm grip on the treads.

The clamp members 44 may be locked rigidly relative to their associated arm portions 41, by the provision of clamping screw members 51 threadedly engaged through lugs 52 on the arm portions 41, the clamping screw members 51 being lockingly engageable with the associated bar elements 45 to lock said bar elements in transverse relationship to their associated arm portions 41, for example, in the positions shown in FIGS. 1 and 2 wherein a dual wheel assembly 49 is clamped in vertical position between the clamping assemblies 44,44. Thus, the screw-supporting lugs 52 project vertically from the top edges of the arm portions 41 and thus overlie the bars 45 when the bars 45 are in vertical positions, enabling the bars 45 to be rigidly clamped to the adjacent arm portions 41. When the clamping screws 51 are released, the clamping assemblies 44 may be rotated around the horizontal axis defined by the transversely aligned pivot pins 43, allowing the wheel assembly 49 to be rotated to a horizontal position, providing access to the brake drum, bearings, or other parts carried in the inside portion of the wheel assembly for repair, cleaning or other servicing operations.

The clamping assemblies 44 are removably mounted so that other suitable clamping assemblies may be substituted therefor. For example, FIG. 6 illustrates the use of a singlewheel clamping assembly 44' having cleats 47' of suitable length to engage transversely over the tread portion of a single tire 48'. Therefore, by substituting the clamping assembly 44', the device may be employed for handling single-tired wheel assemblies.

One clamping lever 37 is provided with actuating arm portions located rearwardly of its fulcrum pin member 38', namely, below as viewed in FIG. 2. The actuating arm portions, namely, for the leftward gripping arm 37, as viewed in FIG. 2, comprise end lugs 60 provided on the leftward triangular plate members 39'. The rightward plate members 39' can be locked to the rightward portions of the plate members 38,39 by a vertical locking pin 61 extending through the rearward portions of the plate members 38,39, as viewed in FIG. 2, and through the intervening rearward corner portions of the rightward triangular plate members 39'. This holds the rightward lever member 37 rigid with the plate members 38,39 and hence with the upstanding post structure of the machine. A hydraulic cylinder 62 is pivoted at 63 between the rearward portions of the plate members 38,39, as viewed in FIG. 2, and the piston rod 64 thereof is pivotally connected between the lugs 60 by a vertical pivot pin 65, as shown in FIG. 2. Thus, the leftward lever member 37 may be rotated in a clockwise direction, as viewed in FIG. 2, by introducing hydraulic fluid under pressure into the cylinder 62, and may be released by releasing said hydraulic fluid from said cylinder. The locking pin 61 is of a removable type and is provided with a top gripping handle 66 enabling it to be easily removed when it is desired to disconnect the rightward lever arm 37, as viewed in FIG. 2, for free swinging movement.

Rigidly secured between the forward portions of the plate members 38,39 is a bracket member 68 in which is rigidly secured a horizontally extending hydraulic cylinder 69 which is located midway between the vertical planes of the base leg portions 15,15 and which is provided with a forwardly extending piston rod 71 provided with a wheel axle-engaging head 70 of generally conical shape, as shown in FIGS. 2 and 3. The abutment member 70 is shaped to closely engage with the end of an axle carrying a wheel assembly to be removed so that when the wheels of the assembly are clamped in the manner illustrated in FIG. 1, the wheel assembly can be removed from the axle by operating the cylinder 69 to extend its piston rod 71. The extension of piston rod 71 exerts a pushing force on the end of the wheel axle while the wheels are being held, so that the wheel assembly is thereby pulled from the associated axle.

It will be understood that in the process above described of pulling a wheel assembly from its axle, the axle must necessarily be supported by suitable jack means, and when the pulling action is performed, the machine 11 must be free to move away from the axle. This movement of the apparatus is permitted by the provision of the supporting wheels 16 and the caster 17.

A manually operated hydraulic ram pump 95 is provided on the vertically movable carriage assembly 23, for example, on the top plate member 38 at the left side of the machine, as viewed in FIG. 2, the ram pump having the operating lever 77. The output of the ram pump is connected through respective manually operated valves 78, 79 and 80 to the carriage elevating cylinder 33, the gripping arm operating cylinder 62 and the wheel puller cylinder 69. It will be understood that when these valves are closed, the pistons of their associated cylinders are locked in their previously set positions, and are releasable by opening the associated valves with the ram pump inactive.

In operation, with the vehicle wheel assembly jacked up, in the manner above described, the apparatus is moved in a position so that the wheel assembly to be removed is located between the opposed pair of locked wheel-gripping assemblies 44, 44, and said clamping assemblies are then elevated by means of the ram cylinder 33 and the actuation of the ram pump handle 77 to elevate the clamping assemblies into positions adjacent diametrically opposite portions of the wheels of the wheel assembly 49, namely, to the positions thereof shown on FIG. 1. The elevating cylinder valve 78 is then closed, to lock the carriage 23 in this position. The pump operating handle 77 is then again operated with the lever-clamping valve 79 open to introduce hydraulic fluid under pressure into the clamping cylinder 62 and thereby cause the leftward clamping lever 37 to rotate in a clockwise direction, as viewed in FIG. 2, to thereby clamp the wheel assembly between the opposed pairs of clamping cleats 47,47, after which the clamping valve 79 is closed. With the wheel puller valve 80 open, the ram pump handle 77 is again actuated to introduce hydraulic fluid under pressure into the wheel puller cylinder 69, causing the piston rod 71 to extend and bring the abutment head 70 into operative engagement with the end of the wheel axle. The handle 77 is then operated sufficiently to provide the necessary thrust to pull the wheel assembly 49 away from its axle in the manner above described, after which the wheel assembly is free to be moved away from the vehicle for subsequent operations thereon. The apparatus can then be moved to a convenient working location and the clamping screws 51 can be then released to allow the wheel assembly to be rotated around the axis of the pivot elements 43 to permit convenient access to the parts to be serviced, such as the wheel drum, bearings, or other parts carried in the wheel assembly. After the necessary repairs, cleaning, or other servicing operations have been performed, the wheel assembly can be returned to its vertical position, and the clamping screws 51 may then be tightened to lock the wheel assembly in said vertical position. The wheel assembly can then be placed on its axle, after which the clamping valve 79 is opened to release the clamping pressure on the wheels' tires. The clamping assemblies 44 can then be pulled away from the wheel assembly, the leftward arm 37 being free to be pulled away manually, and the rightward clamping assembly being released, if so desired, by removing the locking pin 61.

The rightward pivot pin 38' is also removable, as is the leftward pivot pin 38', and a series of openings 90 is provided in the top and bottom plate members 38,39 to set the pins 38' in selected positions according to the positions of said vertically aligned pairs of pin holes 90. This allows for adjustment of the pivotal connections in accordance with the size of the wheel assembly to be handled. Likewise, a series of vertically aligned pairs of pin holes 91 is provided in the top and bottom plates 38,39 to selectively receive the locking pin 61.

Thus, the location of the pivotal connection of the leftward lever 37 can be varied, and similarly, the positioning of the rightward clamping arm 37 can be varied by suitable selection of the respective vertically aligned pairs of pin holes 90 and 91 on the rightward sides of the plate members 38,39.

It will be apparent that the rightward pin 38' may be at times removed, to allow the rightward arm 37 to pivot around the pin 61, and as above mentioned, the pin 61 may be removed, as required, to allow the rightward arm 37 to pivot around the associated pin 38'. Therefore, the rightward clamping lever 37 may be at times free for pivoting, for example, to facilitate the positioning of the two clamping arms in proper positions for clamping a wheel assembly between them. Both pins 61 and 38' associated with the rightward clamping arm 37 are reinserted before the clamping cylinder 62 is operated to apply clamping force to the leftward clamping arm 37. As above mentioned, the locking pin 61 may be removed to facilitate disengagement of the apparatus from the wheel assembly after it has been remounted on the associated vehicle.

After a wheel pulling operation, as above described, the hydraulic pressure in the wheel puller cylinder 69 is released, and the piston rod thereof can therefore be manually retracted to provide swinging clearance for the wheel assembly to allow it to be rotated to a substantially horizontal position, as above described, the clamping arms being of sufficient length to provide such clearance.

The securing pin 63 for the clamping cylinder 62 is likewise insertable in any one of a selected pair of vertically aligned pin holes 92 provided in the plate members 38,39, for adjusting the operating position of the clamping cylinder 62, in accordance with the adjustment of the positions of the pins of the clamping arms 37.

While a specific embodiment of an improved wheel-removing and handling device for dual or single-tired vehicle wheel assemblies has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A wheel-removing and handling device comprising a movable base, an upstanding post member on the rear portion of said base, carriage means slidably engaged on said post member, vertically-acting hydraulic cylinder means operatively connected between said base and said carriage means to adjust said carriage means vertically on said post member, a first horizontal clamping arm secured to one side of said carriage means, a second horizontal clamping arm pivoted on a vertical axis to the other side of said carriage means, said clamping arms having forwardly extending gripping portions provided with wheel-engaging means, horizontally acting clamping hydraulic cylinder means operatively connecting said second clamping arm to said carriage means, horizontally-acting wheel puller hydraulic cylinder means secured to the carriage means and extending forwardly between the clamping arms, hydraulic pump means on the carriage means, and conduit means operatively connecting said hydraulic pump means to the respective hydraulic cylinder means, said conduit means including respective control valves in circuit with the hydraulic cylinder means, said conduit means including respective control valves in circuit with the hydraulic cylinder means, said horizontally acting clamping hydraulic cylinder means disposed rearwardly of said upstanding post member and wherein said clamp members comprise respective bar elements pivoted at their intermediate portions to said clamping arms, and a plurality of spaced parallel cleat members rigidly secured to each bar element and adapted to transversely clampingly engage on a tire tread.

2. The wheel-removing and handling device of claim 1, and wherein said wheel-engaging means comprises respective clamp members pivotally connected to the clamping arms for rotation on a common horizontal transverse axis.

3. A wheel-removing and handling device comprising a movable base, an upstanding post member on the rear portion of said base, carriage means slidably engaged on said post member, vertically-acting hydraulic cylinder means operatively connected between said base and said carriage means to adjust said carriage means vertically on said post member, a first horizontal clamping arm secured to one side of said carriage means, a second horizontal clamping arm pivoted on a vertical axis to the other side of said carriage means, said clamping arms having forwardly extending gripping portions provided with wheel-engaging means, horizontally acting clamping hydraulic cylinder means operatively connecting said second clamping arm to said carriage means, and horizontally-acting wheel puller hydraulic cylinder means secured to the carriage means and extending forwardly between the clamping arms, wherein said wheel-engaging means comprises respective clamp members pivotally connected to the clamping arms for rotation on a common horizontal transverse axis, and wherein said clamping arms include end elements carrying said clamp members, said end elements being angled so as to be substantially parallel to each other in wheel-gripping positions and being of sufficient length to provide clearance for rotating a wheel assembly gripped therebetween to a substantially horizontal position, and wherein said clamp members comprise bar members pivoted at their intermediate portions to said clamping arm end elements, and spaced tire tread-engaging cleat members perpendicularly secured to said bar members.

4. The wheel-removing and handling device of claim 3, and wherein said locking means comprises clamping screws threadedly mounted on the clamping arms and being lockingly engageable with the pivoted clamp members.

5. The wheel-removing and handling device of claim 3, and hydraulic pump means on the carriage means, and conduit means operatively connecting said hydraulic pump means to the respective hydraulic cylinder means.

6. The wheel-removing and handling device of claim 5, and wherein said conduit means includes respective control valves in circuit with the hydraulic cylinder means.

7. The wheel-removing and handling device of claim 6, and wherein the axis of the wheel puller hydraulic cylinder means extends substantially perpendicular to said transversely extending horizontal axis of rotation of the clamp members.

8. The wheel-removing and handling device of claim 7, and wherein said wheel puller hydraulic cylinder means comprises a hydraulic cylinder secured to the carriage means and having a piston provided with a piston rod projecting toward said horizontal axis of rotation of the clamp members, and a substantially conical axle-engaging head member on the end of said piston rod.

9. The wheel-removing and handling device of claim 1, and wherein said first horizontal clamping arm is secured to said one side of the carriage means by means of a pair of spaced vertical fastening pin elements, at least one of such fastening pin elements being removable to at times allow said first clamping arm to rotate freely.

* * * * *